United States Patent
Lee et al.

(10) Patent No.: US 8,159,494 B2
(45) Date of Patent: Apr. 17, 2012

(54) SYSTEM AND METHOD FOR DESIGNING CURVES

(75) Inventors: Joo-Haeng Lee, Daejeon (KR); Jae-Ho Lee, Daejeon (KR); Ho-Wook Jang, Daejeon (KR); In-Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1146 days.

(21) Appl. No.: 11/947,430

(22) Filed: Nov. 29, 2007

(65) Prior Publication Data

US 2008/0143726 A1 Jun. 19, 2008

(30) Foreign Application Priority Data

Dec. 4, 2006 (KR) .................. 10-2006-0121408
Oct. 5, 2007 (KR) .................. 10-2007-0100392

(51) Int. Cl.
*G06T 11/20* (2006.01)
(52) U.S. Cl. ........................................ 345/442
(58) Field of Classification Search .................. None
See application file for complete search history.

(56) References Cited

U.S. PATENT DOCUMENTS

| | | | | |
|---|---|---|---|---|
| 5,613,048 A | * | 3/1997 | Chen et al. | 345/419 |
| 6,441,823 B1 | * | 8/2002 | Ananya | 345/442 |
| 7,091,995 B2 | | 8/2006 | Lee et al. | |
| 2008/0143726 A1 | * | 6/2008 | Lee et al. | 345/442 |

FOREIGN PATENT DOCUMENTS

KR 1020030048620 A 6/2003

OTHER PUBLICATIONS

Lee, J. H. et al., "Interactive Control of Geometric Shape Morphing based on Minkowski Sum", *Society of CAD/CAM Engineers*, Republic of Korea (2004).

* cited by examiner

*Primary Examiner* — Xiao M. Wu
*Assistant Examiner* — David H Chu

(57) ABSTRACT

A curve designing system/method is provided. When similar curves are to be generated by evenly mixing features of given sample curves, the method of the present invention can control the extent of mixing features, smoothness, and size. The technology of the present invention can be applied to designing curve and curved surface in the fields of computer graphics and Computer-Aided Design (CAD).

14 Claims, 12 Drawing Sheets

(a)

(b)

(c)

Linear growth    Hierarchical linear growth    Bezier growth (a)  (b)  (c)  (d)  (e)  (f)  (g)  (h)  (i)

(a)　(b)　(c)　(d)　(e)

SYSTEM AND METHOD FOR DESIGNING CURVES

BACKGROUND OF THE INVENTION

1. Field of the Invention

The present invention relates to curve designing technology, and more particularly, to a curve designing system/method that can adjust the extent of mixing curves, smoothness and size based on hierarchical growth of curve to create a similar curve by evenly mixing features of sample curves, when a curve is designed using given sample curves.

This work was supported by the IT R & D program of MIC/IITA [2006-S-045-01, "Development of Function Extensible Real-Time Renderer"].

2. Description of the Related Art

Curve is a significant element capable of defining shape, motion, and other feature values of an object in computer graphics and Computer-Aided Design (CAD). Particularly, a curved surface can be acquired through a simple combination of two curves in a geometrical modeling field. In short, curve designing is a core part of geometric object designing.

There are two methods in expressing curve in a computer. One is polylining and the other is parameterized curve.

The polylining is a method of connecting two points given on a curve in straight line segment. This is simple, so its software algorithm is quick and it can be easily realized in hardware. Polylining can easily represent complicated curves. Thus, it is widely used in the fields of computer graphics and game. However, since the curve is represented by connecting straight lines, it is not smooth. This makes polylining inappropriate to design the surface of automobiles and airplanes.

On the other hand, the parameterized curve method is mathematical method representing curve using polynomial. The method is more complicated than the polylining method, but it is proper to representing smooth curve. One of the most widely used parameterized curve method is Bezier curve method. B-spline curve which is a generalized version of the Bezier curve can represent multiple Bezier curve segments which are smoothly connected. Non-Uniform Rational B-Spline (NURBS) is what the B-spline is extended based on rational polynomial.

Bezier curve can represent complicated curve with a single curve. However, the degree of the polynomial is so high that it may be difficult to deal with the Bezier curve and represent the complicated features. With B-spline, it is rather easy to deal with the complicated features by connecting low-degree curve segments. However, there is a shortcoming in the mathematical continuity due to the low degree. NURBS is a more generalized form than B-spline. It is widely used due to an advantage that it can accurately represent secondary curves such as circle and oval, but it is very hard to use NURBS.

Bezier curve was developed by Pierre Bezier, who was a French engineer working in Renault Motors in early 1960s and became known as he used it in automobile designing. Since then, advantages of Bezier curve have been revealed by many researches and it is now predominant as a method for representing curves in the fields of computer graphics and CAD.

According to Bezier curve, n+1 control points are given and they are defined as a mixture of Bernstein polynomial. To be specific, an $i^{th}$ control point $b_i$ has a weight of an $i^{th}$ n-degree Bernstein polynomial $B_i^n(t)$. Therefore, a Bezier curve b(t) is defined as $$\sum_{i=0}^{n} B_i^n(t) b_i.$$

It is possible to change and represent a curve represented through the polylining method into a parameterized curve. This is carried out through interpolation and approximation.

Many curves are designed using pre-designed curves. There are several examples.

A first one is designing a similar but new curve based on existing curves

A second one is designing animation in which the shape of an object changes. When the shape of an object is directly represented as a curve or when its framework is represented as a curve, the curve shape in the middle should be inferred, given only with the shape of initial curve and the shape of end curve.

A third one is designing a curved surface connecting two curves.

When features of curves are to be mixed and features of given curves are complicated, it is most difficult to make correspondence among the features. Researchers have suggested many methods based on pattern recognition, differential geometry, and computational geometry to resolve the problem. In the end, it is required to develop a method for easily making the correspondence based on growth of curve.

SUMMARY OF THE INVENTION

Accordingly, the present invention is directed to a curve designing system and method, which substantially obviates one or more problems due to limitations and disadvantages of the related art.

It is an object of the present invention to provide a curve designing system and method that can easily make feature correspondence, smoothly mix the corresponding features and providing additional control method in generating similar curves by mixing given curves.

To be specific, the present invention takes advantage of a fact that all curves go through very simple growth process from the perspective of curve growth no matter how the curves are complicated. In short, the present invention reversely traces the growth process of complicated curves in a simple process and makes correspondence among features.

When a curve does not follow a curve growing method, a curve growth process is defined as a difference $b''(t)-b^1(t)$ between a given curve $b''(t)$ and a straight line $b^1(t)$ connecting both ends of the curve. The method, however, is not useful to feature correspondence, because the method does not show the structural and sequential development of the curve. The above growth path is called a straight line growth path, because a point $b^1(t)$ grows along a straight line only.

After the feature correspondence, a curve similar to the given curve is formed by mixing the corresponding features. Basically, linear interpolation is performed in this process. However, the method of the present invention interpolates the features through multi-linear or non-linear method. This makes it possible to flexibly control mixing of the features.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system for designing curves, including: a user input unit supporting input from a user; a low-rank curve computation unit for computing low-rank curves, which are (n−1)-degree Bezier curves, and vector fields in response to the input from the user; a curve growth computation unit for computing a growth curve based on the low-rank curves; and a curve mixed computation unit for designing new curves by mixing curves inputted through the user input unit, the low-rank curves, and the growth curve.

In another aspect of the present invention, there is provided a method for designing curves, including the steps of: computing low-rank curves and vector field in response to input values inputted from a user, which include two inputted Bezier curves, lowest degree of the lowest-rank curve, growing method of each curve, control parameter of each curve growing method, extrapolation constant β, growth section, and growth interval; computing a growth curve based on the low-rank curves; and designing new curves by mixing the input values from the user, the low-rank curves and the growth curve.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
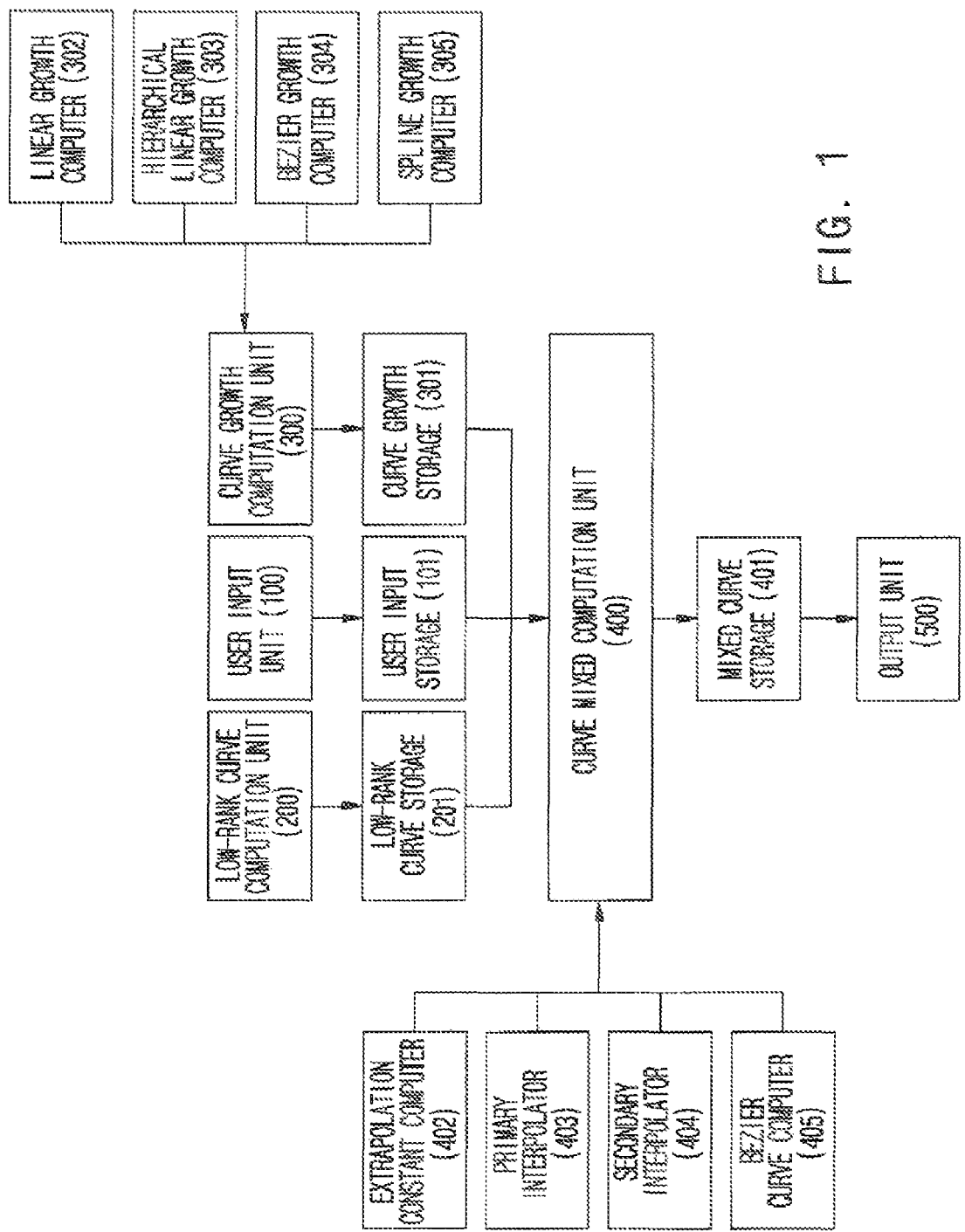
FIG. 1 is a curve designing system in accordance with an embodiment of the present invention.

FIG. 1 is a curve designing system in accordance with an embodiment of the present invention.

Referring to FIG. 1, the curve designing system of the present invention includes a user input unit 100, a low-rank curve computation unit 200, a curve growth computation unit 300, a curve mixed computation unit 400, and an output unit 500.

What is inputted into the user input unit 100 is stored in a user input storage 101. The user input unit 100 receives and stores control points for representing two Bezier curves and degrees, growing method of each curve, parameters needed for each growing method, and a value for computing an extrapolation constant.

The low-rank curve computation unit 200 is frequently used in a curve growth computation unit 300. Thus, low-rank curves of a curve inputted by a user are pre-computed and stored in a low-rank curve storage 201 to be used.

The curve growth computation unit 300 stores computation results in a curve growth storage and uses the computation results for subsequent process. The curve growth computation unit 300 includes four sub modules: a linear growth computer 302, a hierarchical linear growth computer 303, a Bezier growth computer 304, and a spline growth computer 305. Each module computes actual curve growth based on the following equations 4, 6, 7 and 9, respectively.

The curve mixed computation unit 400 performs a primary interpolation onto the lowest-rank curve specified in a primary interpolator 403 and performs a secondary interpolation onto the result and a growth curve in a secondary interpolator 404 by using two curves inputted by the user, which are stored in a user input storage 101, low-rank curves of the two curves inputted by the user, which are stored in a low-rank curve storage 201, and a growth curve acquired based on the low-rank curves of the two curves inputted by the user, which is stored in a curve growth storage 301. Then, the curve mixed computation unit 400 performs a primary interpolation on the result corresponding to an extrapolation constant inputted by the user in an extrapolation constant computer 402 to mix curves, registers the mixed curve in a mixed curve storage 401, and outputs it to the user in the output unit 500. The Bezier curve computation unit 405 converts the degree of curve, computes spline control points, and computes output results.

Hereinafter, a curve designing method using the curve designing system of the present invention having the above-described structure will be described in detail.

Figure 12:
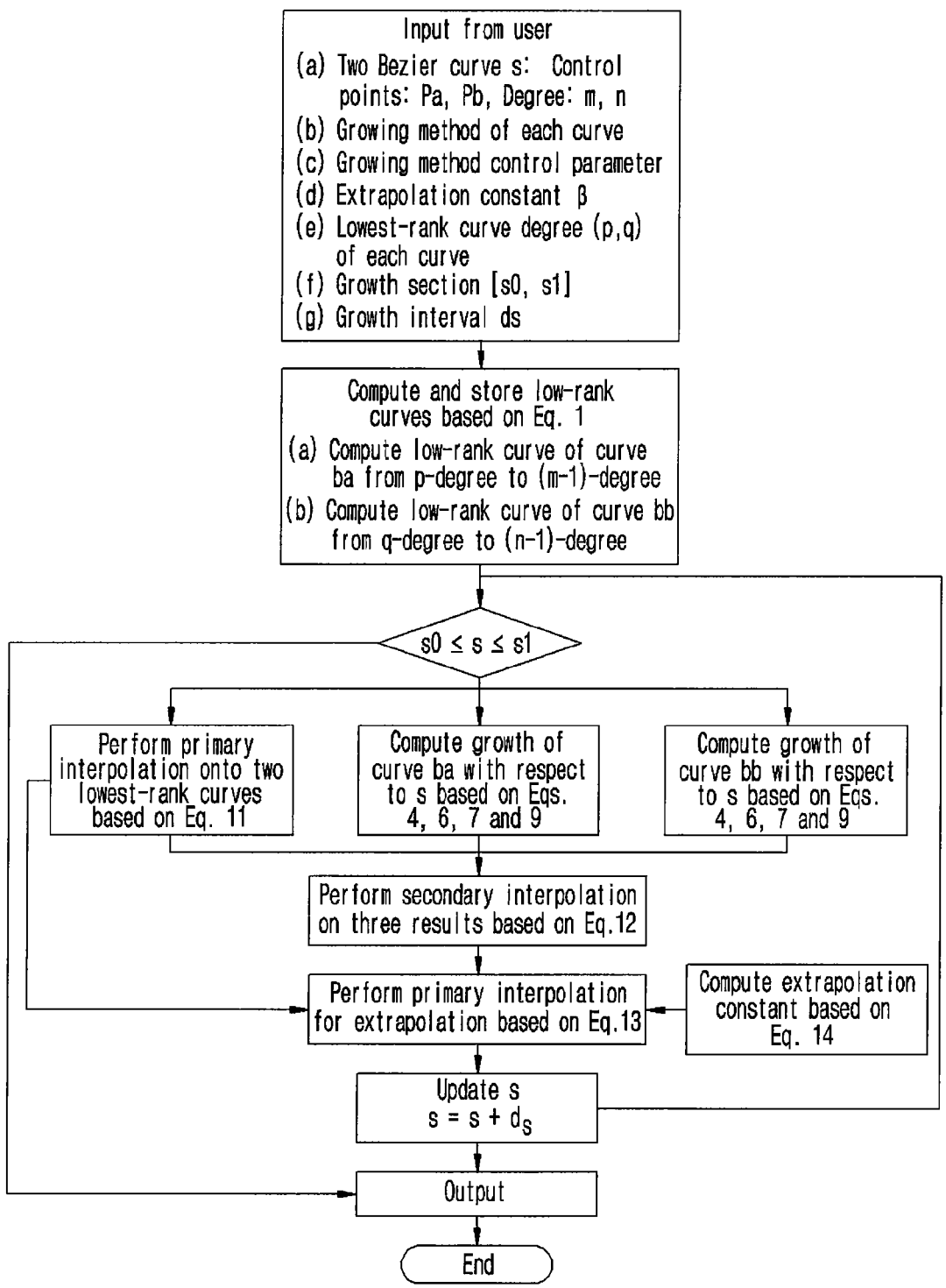
FIG. 12 is a flowchart describing operation of a curve designing system in accordance with an embodiment of the present invention.

The curve designing method of the present invention is described in FIG. 12 very well. Thus, the operation in each step of the operation flowchart of FIG. 12 will be described in detail with reference to the drawing.

FIG. 12 is a flowchart describing operation of a curve designing system in accordance with an embodiment of the present invention.

First, a user inputs two Bezier curves, degree of the lowest-rank curve, a growing method of each curve, a control parameter for each growing method, extrapolation constant β, growth section, and growth interval.

Herein, the present invention basically deals with a curve designing method based on parameterized curve method. In particular, only curves represented as single Bezier curves are dealt with. A Bezier curve is defined by mixing n+1 control points based on Bernstein polynomial, when the n+1 control points are given. To be specific, an $i^{th}$ control point $b_i$ has a weight of an $i^{th}$ n-degree Bernstein polynomial $B_i^n(t)$. Therefore, a Bezier curve b(t) is defined as $\sum_{i=0}^{n} B_i^n(t) b_i$.

In the present invention, growth of curve is represented based on a characteristic that a Bezier curve is decomposed into low-rank curve and vector field. The decomposition is called Bezier curve decomposition. To be more specific, an n-degree Bezier curve $b^n(t)$ is decomposed into an (n−1)-degree Bezier curve $b^{n-1}(t)$ and an (n−2)-degree vector field $f^{n-2}(t)$.

$$b^n(t) = b^{n-1}(t) + 2t(1-t)f^{n-2}(t) \quad \text{Equation 1}$$

The vector field of Equation 1 shows a difference between two adjacent Bezier curves. In short, the following relationship is made.

$$b^n(t) - b^{n-1}(t) = 2t(1-t)f^{n-2}(t) \quad \text{Equation 2}$$

Attention should be paid to a fact that the difference between the two adjacent Bezier curves is the vector field multiplied by 2t(1−t). This is a restrictive condition for matching both ends.

The following Equation 3 is acquired when the Equation 1 is reflexively applied.

$$b^n(t) = b^1(t) + 2t(1-t) \sum_{i=0}^{n-2} f^i(t) \quad \text{Equation 3}$$

The given curve $b^n(t)$ is finally decomposed into a 1-degree curve $b^1(t)$ and a series of vector field $f^i(t)$.

Figure 2:
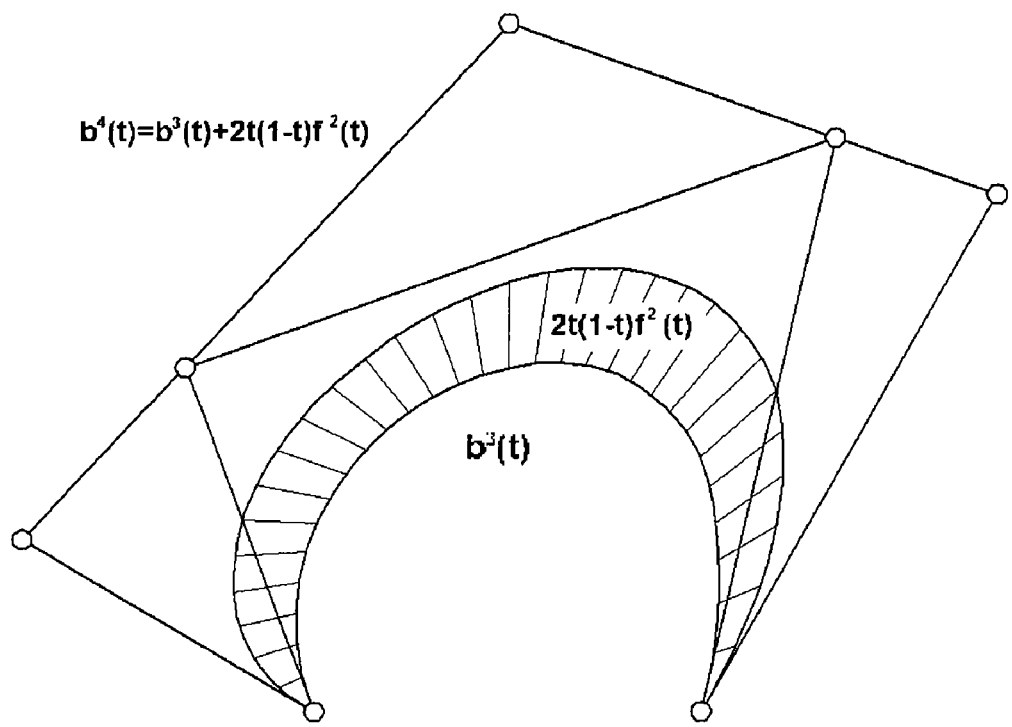
FIG. 2 exemplary shows a step of applying curve analysis to a 4-degree curve in accordance with an embodiment of the present invention.
Figure 3:
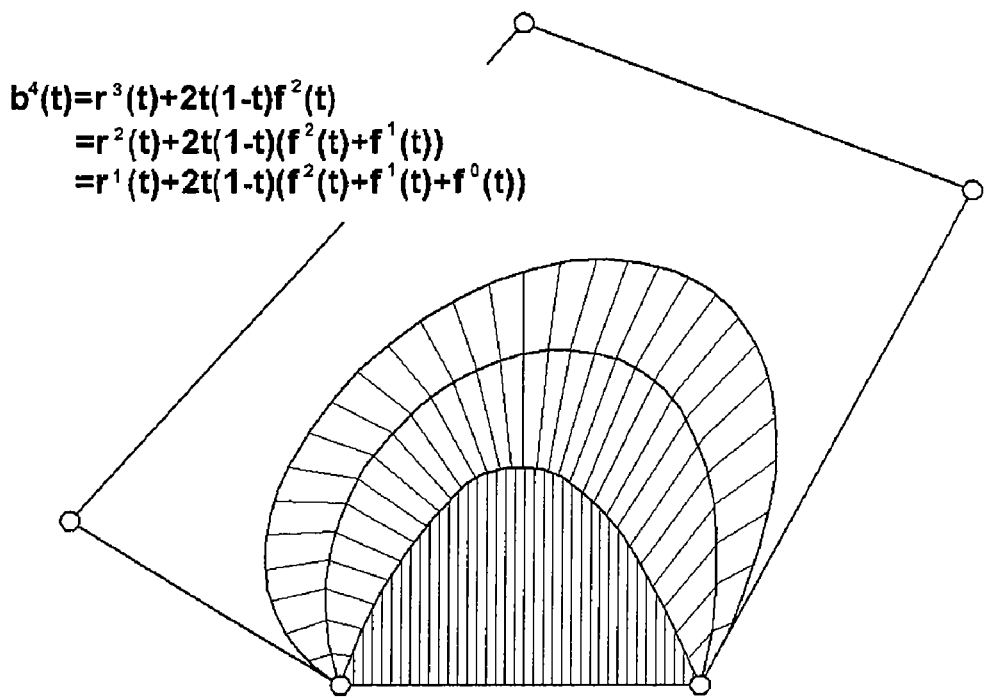
FIG. 3 exemplary shows entire steps of applying curve analysis to a 4-degree curve in accordance with an embodiment of the present invention.

FIG. 2 exemplary shows a step of applying curve analysis to a 4-degree curve in accordance with an embodiment of the present invention, and FIG. 3 exemplary shows entire steps of applying curve analysis to a 4-degree curve in accordance with an embodiment of the present invention.

FIG. 2 shows an example of decomposing a 4-degree Bezier curve $b^4(t)$ into a 3-degree low-rank curve $b^3(t)$ and 2-degree vector field $f^2(t)$ based on the Equation 1. Herein, the vector field $f^2(t)$ shows a growth path of the low-rank curve $b^3(t)$ growing into the given curve $b^4(t)$.

FIG. 3 shows an example of decomposing a 4-degree Bezier curve $b^4(t)$ into a series of low-rank curves and vector field based on the Equation 3. The 4-degree Bezier curve $b^4(t)$ is decomposed in a sequence of $b^3(t)$, $b^2(t)$ and $b^1(t)$, and vector fields $f^2(t)$, $f^1(t)$, and $f^0(t)$ are sequentially defined between the two adjacent curves.

FIG. 3 shows a given curve sequentially grows from a straight line $b^1(t)$ into steps of $b^2(t)$, $b^3(t)$, and $b^4(t)$. In addition, the drawing shows a path that one point of $b^1(t)$ grows into a corresponding point of $b^4(t)$ is defined along the vector fields.

Figure 4:
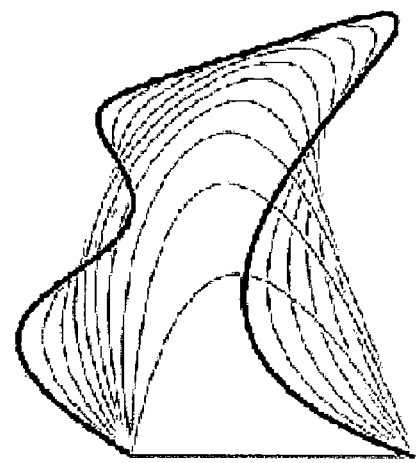
FIG. 4 exemplary shows entire steps of applying curve analysis to an 11-degree curve in accordance with an embodiment of the present invention.
Figure 4:
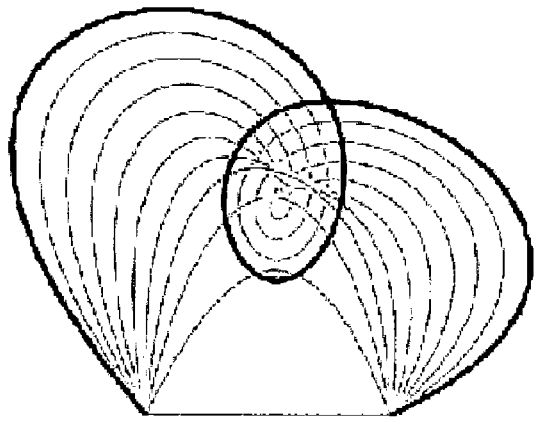
Figure 4:
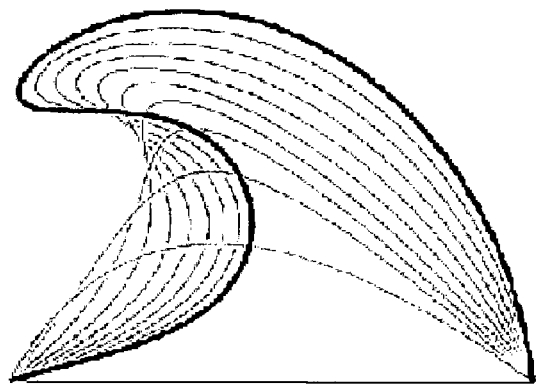

FIG. 4 exemplary shows entire steps of applying curve analysis to an 11-degree curve in accordance with an embodiment of the present invention.

FIG. 4 show low-rank curves of three different 11-degree curves.

The curve growth path of the present invention is hierarchically defined using a series of low-rank curves. In short, with respect to a parameter s, a path $d_p(s,t)$ that one point of the straight line $b^1(t)$ grows into a point of $b^4(t)$ is defined as follows.

$$d_p(s, t) = b^1(t) + 2t(1-t) \sum_{i=0}^{n-2} \alpha_i(s) f^i(t) \quad \text{Equation 4}$$

where $\alpha_i(s)$ is a weight that $f^i(t)$ contributes to the growth path.

The growth path becomes different according to how $\alpha_i(s)$ is defined. For example, the $\alpha_i(s)$ may be defined with respect to a pre-defined section $\{s_i | 0 = s_o < s_1 < L < s_i < L < s_{n-1} = 1\}$ as follows.

$$\alpha_i(s) = \begin{cases} 0 & \text{for } s < s_i \\ \frac{s - s_i}{s_{i+1} - s_i} & \text{for } s \in [s_i, s_{i+1}] \\ 1 & \text{for } s > s_{i+1} \end{cases} \quad \text{Equation 5}$$

Herein, a parameter section $s_i$ can be defined as $s_i = i/(n-1)$. In this case, the adjacent low-rank curves have the same growth speed. This growth is called a hierarchical linear growth.

The growth path may be defined in curve. It may be defined as a hierarchical Bezier growth $d_b(s,t)$ and a hierarchical spline growth $d_s(s,t)$.

The hierarchical Bezier growth takes points $b^i(t)$ of low-rank curve corresponding to a predetermined i as control points of a Bezier curve and takes a curve $d_b(s,t)$ defined by the control points as a growth path. It is mathematically defined as follows.

$$d_b(s, t) = \sum_{i=0}^{n-1} b^{i+1}(t) B_i^{n-1}(s) \quad \text{Equation 6}$$

$$= b^1(t) + 2t(1-t) \sum_{i=0}^{n-1} \sum_{j=0}^{i-1} f^j(t) B_i^{n-1}(s)$$

The hierarchical spline growth acquires a 3-degree spline curve $d_s(s,t)$ passing a point $b^i(t)$ of each low-rank curve corresponding to a predetermined I, takes it as a growth path. It is defined in the form of a 3-degree B-spline as follows.

$$d_s(s, t) = \sum_{i=0}^{n-1} p_i N_{i,3}(s) \quad \text{Equation 7}$$

Herein, $p_i$ is calculated as a control point of 3-degree spline satisfying an interpolation restrictive condition of the below equation with respect to $s_i$.

$$d_s(s_i,t)=b^i(t) \qquad \text{Equation 8}$$

Also, $N_{i,3}(s)$ is a 3-degree basis function of B-spline.

Both hierarchical Bezier growth and hierarchical spline growth present smoother growth curve than the hierarchical linear growth. The difference between the two curve growth is whether the interpolation restrictive condition of Equation 8 is satisfied or not. The hierarchical spline growth needs additional computation process to satisfy the interpolation restrictive condition, compared to the hierarchical Bezier growth.

When the hierarchical growth path of the present invention is not followed, the curve growth path can be simply defined as difference $b''(t)-b^1(t)$ between a given curve $b''(t)$ and a straight line $b^1(t)$ connecting both ends of the curve. The curve growth path here is as follows.

$$d_l(s,t)=(1-s)b^1(t)+sb''(t) \qquad \text{Equation 9}$$

However, since the method cannot show the structural and sequential development of curve, it is not useful to make feature correspondence. The above growth path is called a straight line growth path. Herein, one point of $b^1(t)$ grows along a straight line only.

Figure 5:
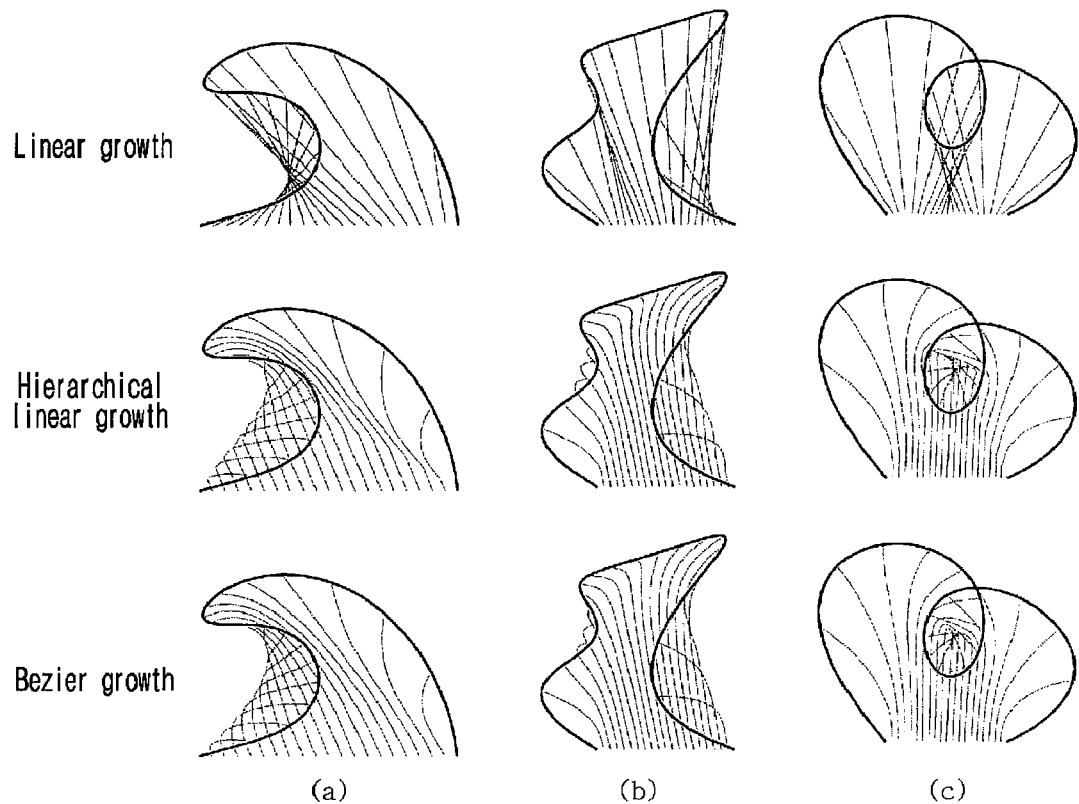
FIG. 5 is exemplary view comparing growth paths of a hierarchical growth scheme and a linear growth scheme in accordance with an embodiment of the present invention.

FIG. 5 is exemplary view comparing growth paths of a hierarchical growth scheme and a linear growth scheme in accordance with an embodiment of the present invention.

FIG. 5 shows linear growth, hierarchical linear growth, and Bezier growth with respect to three 11-degree curves (a), (b) and (c). In the linear growth, all growth path is straight line. In the hierarchical linear growth, a growth path is structurally formed by connecting small straight line paths. In the Bezier growth, the growth path is similar to the hierarchical linear growth but smoother.

Figure 6:
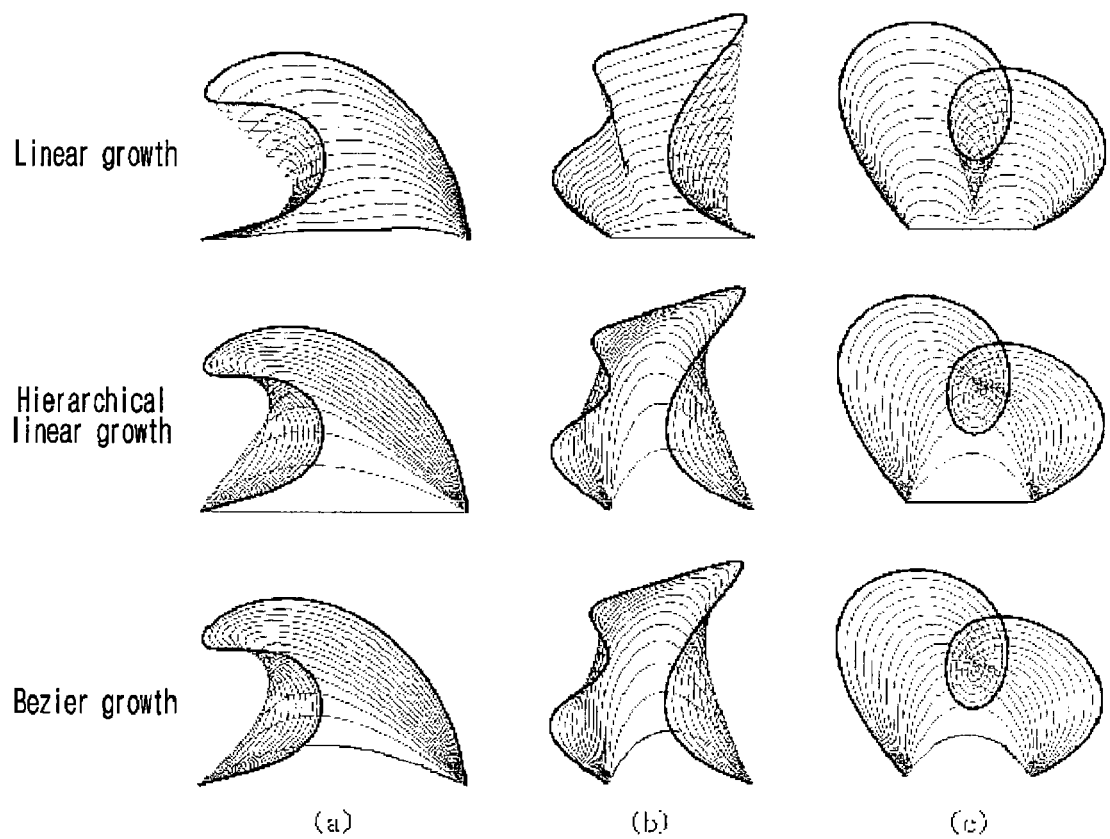
FIG. 6 is exemplary view comparing growth steps of a hierarchical growth scheme and a linear growth scheme in accordance with an embodiment of the present invention.

FIG. 6 is exemplary view comparing growth steps of a hierarchical growth scheme and a linear growth scheme in accordance with an embodiment of the present invention.

FIG. 6 shows curves growing along a growth path. It seems that there is no distinctive difference in the growth path of FIG. 6, but the difference is apparently shown in FIG. 7.

Figure 7:
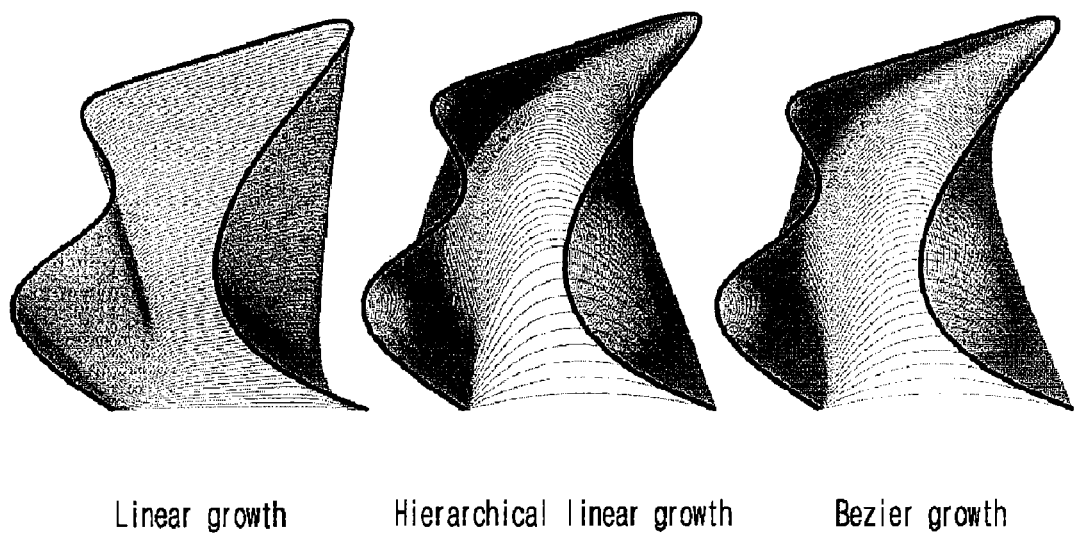
FIG. 7 is exemplary view comparing continuity of growth steps of hierarchical growth scheme and linear growth scheme in accordance with an embodiment of the present invention.

FIG. 7 is exemplary view comparing continuity of growth steps of hierarchical growth scheme and linear growth scheme in accordance with an embodiment of the present invention.

FIG. 7 shows the difference between the hierarchical linear growth scheme and a Bezier growth scheme. The Bezier growth is made smoothly, whereas the hierarchical linear growth seems discontinuous.

Figure 8:
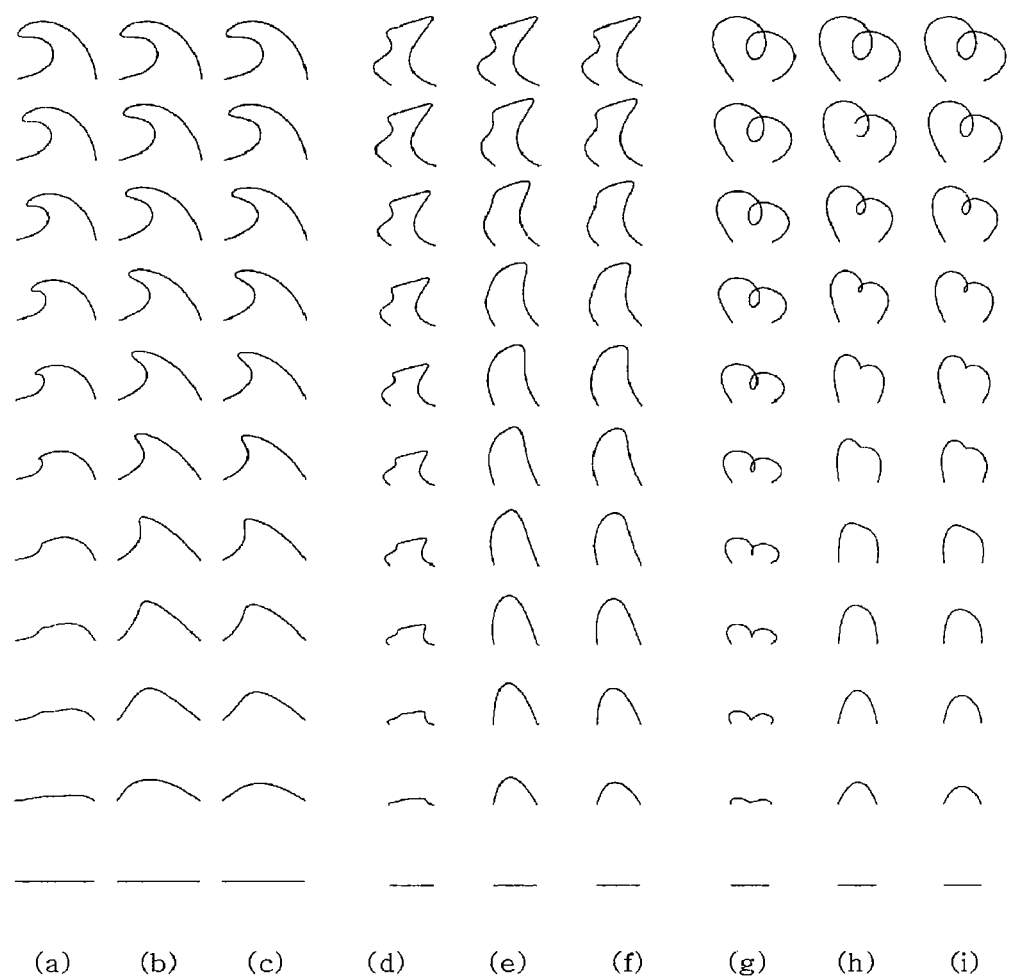
FIG. 8 is exemplary view sequentially comparing growth steps of hierarchical growth scheme and linear growth scheme in accordance with an embodiment of the present invention.

FIG. 8 is exemplary view sequentially comparing growth steps of hierarchical growth scheme and linear growth scheme in accordance with an embodiment of the present invention.

Referring to FIG. 8, (a), (d) and (g) show linear growth. The feature of the linear growth is that all features of curve are activated from the initial stage. This is not useful to the feature correspondence of curve using growth steps. On the other hand, (b), (e) and (h) using hierarchical linear growth and (c), (f) and (i) using Bezier growth have smooth and simple features in the initial stage of growth and the features grow distinctive gradually.

A parameter s can be regarded as age of curve from the perspective that it represents growth step of the curve. To be specific, when s=0, the curve is in the step of straight line, which is the youngest. When s=1, it indicates a corresponding current growth step of the given curve. In case of linear growth or Bezier growth, definition can be made even when s is smaller than 0 or greater than 1. This is a sort of extrapolation.

Figure 9:
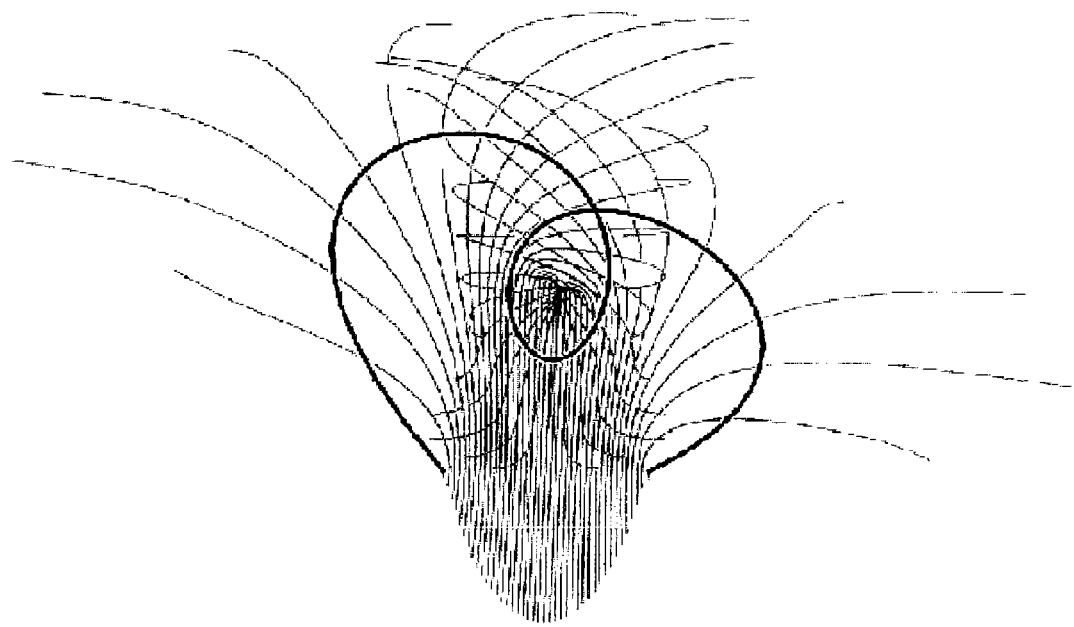
FIG. 9 exemplary illustrates a growth path when Bezier growth is extended out of a section in accordance with an embodiment of the present invention.

FIG. 9 exemplary illustrates a growth path when Bezier growth is extended out of a section in accordance with an embodiment of the present invention.

FIG. 9 shows an example where the Bezier growth path of FIG. 5 is extended out of a [0,1] section.

Figure 10:
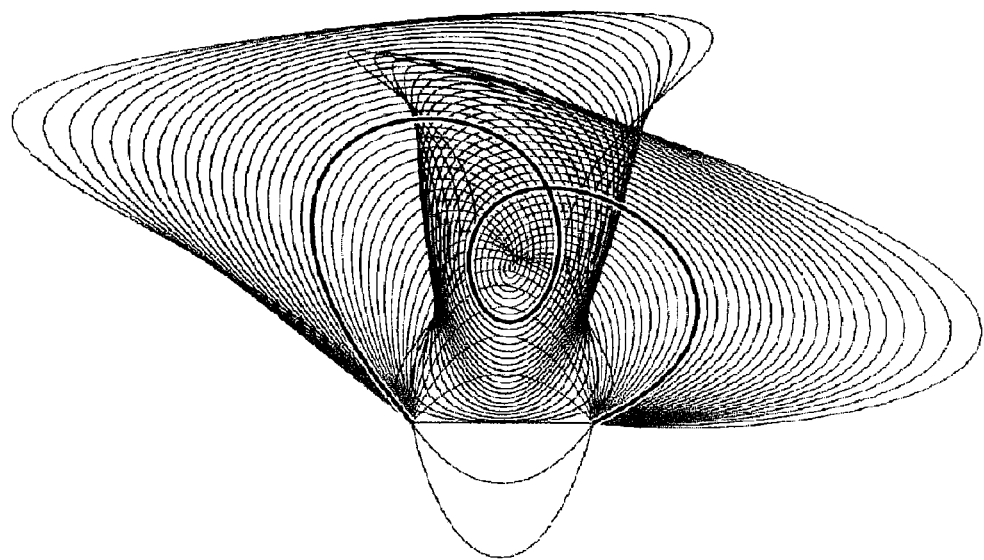
FIG. 10 is exemplary view comparing continuity of growth path when Bezier growth is extended out of a section in accordance with an embodiment of the present invention.

FIG. 10 is exemplary view comparing continuity of growth path when Bezier growth is extended out of a section in accordance with an embodiment of the present invention.

FIG. 10 shows what is extended from the growth step of FIG. 6 along the growth path of FIG. 9. Particularly, when s is greater than 1, it shows how much a curve will grow from the current step.

Hereinafter, a curve designing method based on growth of curve will be described. Particularly, a method of creating a series of curves with mixed feature of the two curves will be described, when two curves of different degrees are given.

When two curves $b_a(t)$ and $b_b(t)$ are given and the degrees of the two curves are m and n, respectively, middle curve $t_l(s,t)$ according to conventional linear mixing method is represented as follows.

$$t_l(s,t)=(1-s)b_a(t)+sb_a(t) \qquad \text{Equation 10}$$

The middle curve resulting from the linear mixing method is not smooth and monotonous in variation. Thus, it is not regarded as fine middle curve, except some special cases.

Figure 11:
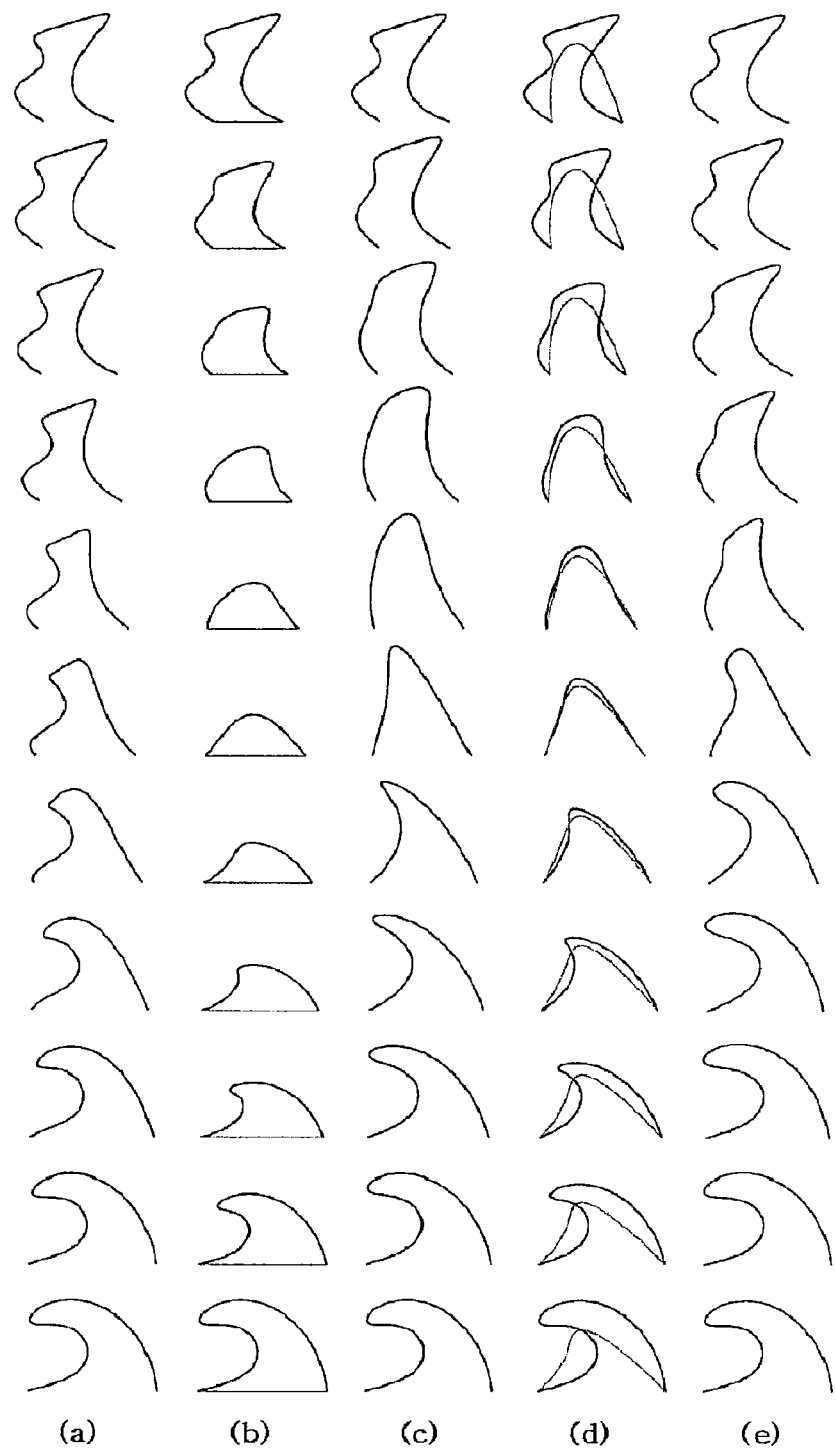
FIG. 11 exemplary shows a growth step when Bezier growth is extended out of a section in accordance with an embodiment of the present invention.

FIG. 11 exemplary shows a growth step when Bezier growth is extended out of a section in accordance with an embodiment of the present invention.

Referring to FIG. 11, curves of (a) are acquired by mixing the given two curves based on the Equation 10. It can be seen that the curves of (a) are not as smooth as curves of (e), which are acquired according to the method of the present invention. Particularly, sharp edges that do not exist in the given curves appear. This is undesirable but inevitable in the conventional linear mixing method.

According to the present invention, middle curves are created using non-linear mixing based on hierarchical growth. First, given curves $b_a^m(t)$ and $b_a^n(t)$ and the lowest-rank curves $b_a^p(t)$ and $b_a^q(t)$ in the growth step of the curves defined as the Equation 1 are selected. Herein, p and q are degrees of the lowest-rank curves, and 0<p<m and 0<q<n.

The growth-based curve missing is a step 1 and it is expressed as the following quadratic equation.

$$t^1(s,t)=(1-s)b_a^p(t)+sb_b^q(t) \qquad \text{Equation 11}$$

$$t^2(s,t)=d^a(s,t)B_0^2(s)+t^1(s,t)B_1^2(s)+d^b(s,t)B_2^2(s) \qquad \text{Equation 12}$$

In the above equations, $t^1(s,t)$ is acquired by mixing the lowest-rank curves $b_a^p(t)$ and $b_a^q(t)$ of the two given curves. Any one among the above-described hierarchical growing methods, e.g., hierarchical linear growth, Bezier growth, and spline growth can be used. $t^2(s,t)$ is acquired by mixing $t^1(s,t)$, $d^a(s,t)$ and $d^b(s,t)$ based on 2-degree Bezier curve.

Referring to FIG. 11, curves of (b) show middle curves mixed and acquired when p and q are 1, that is, when the lowest-rank curves are straight line. The curves of (b) are smoother than the curves of (a). However, the curves of (b) are somewhat small. This is because middle curves that are not sufficiently grown using the Equations 11 and 12 are mixed. To resolve this problem, the size of the middle curves should be adjusted.

The present invention suggests the following size adjustment method. That is, the $t^1(s,t)$ and $t^2(s,t)$ are extrapolated as follows.

$$t(s,t)\equiv(1-e(s))t^1(s,t)+e(s)t^2(s,t) \quad \text{Equation 13}$$

Herein, the extrapolation weight $e(s)$ is determined as follows.

$$e(s) = \frac{1}{1-\beta s(1-s)} \quad \text{Equation 14}$$

This is the same principle as curves are extrapolated out of [0,1] section in FIGS. 9 and 10.

Curves of (c) are acquired by extrapolating the $t^1(s,t)$ and $t^2(s,t)$, when $\beta=2.5$. The size of curves are grown more than the curves of (b), and the smoothness is maintained. However, the curves of (c) have the features of the two given curves appear less. This is because $t^1(s,t)$ is defined with respect to the lowest-rank curves where p and q are 1.

In this case, the present invention suggests adjusting the extent of mixing features by adjusting the p and q values.

Curves of (d) are acquired based on the Equation 11 when p and q are 4. In other words, they are acquired when the degree of the lowest-rank curve is 4. Just as the curves of (b) are, the curves of (d) are somewhat small. Herein, it is possible to acquire curves of (e) having well-mixed features of the two curves, proper size, and smoothness by applying the Equation 13 and giving $\beta$ a value of 4 ($\beta=4$).

In the method of the present invention, the given curves do not have to be parameterized curves. It is also possible to convert curves represented in the polylining method into parameterized curves and use the acquired parameterized curves. This is carried out through mathematical interpolation and approximation. Therefore, the method of the present invention can use not only parameterized curves, but also curves represented in the polylining method.

Also, the method of the present invention can use B-spline curves or NURRBS curves by approximating them into Bezier curves.

As described above, the curve designing system and method of the present invention can easily make correspondence among curve features, smoothly mix the corresponding curve features, and provide an additional control method such as size control, when it create similar curves by mixing given curves. Particularly, the method of the present invention may be extended into an application system to be applied to animation of computer graphics and to designing curved surface in CAD. The technology of the present invention is not only quick in computation but also create smooth curves, compared to conventional technology.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for designing curves, comprising:
a user input unit supporting input from a user;
a low-rank curve computation unit for computing low-rank curves, which are (n−1)-degree Bezier curves, and vector fields in response to the input from the user;
a curve growth computation unit for computing a growth curve based on the low-rank curves; and
a curve mixed computation unit for designing new curves by mixing curves inputted through the user input unit, the low-rank curves, and the growth curve.

2. The system of claim 1, further comprising:
an output unit for outputting result of the curve mixed computation unit.

3. The system of any one of claims 1 and 2, wherein data inputted to the user input unit include two Bezier curves, lowest degree of the lowest-rank curve, growing method of each curve, control parameter of each curve growing method, extrapolation constant .beta., growth section, and growth interval.

4. The system of claim 3, wherein the curve growth computation unit includes:
a linear growth computer for performing computation in such a manner that a growth path is a straight line;
a hierarchical linear growth computer for performing computation in such a manner that growth speed of adjacent low-rank curves is the same;
a Bezier growth computer for computing a growth path of a curve $d_b(s,t)$ by taking points $b^i(t)$ of a low-rank curve corresponding to predetermined t as control points of the Bezier curves in the n-degree Bezier curve $b^n(t)$ defined by a parameter t where n is a natural number; and a spline growth computer for computing a growth path of 3-degree spline curve $d_s(s,t)$ passing a point $b^i(t)$ of each low-rank curve corresponding to the predetermined t.

5. The system of claim 4, wherein the curve mixed computation unit includes:
an extrapolation constant computer for computing an extrapolation constant corresponding to the $\beta$ value;
a primary interpolator for performing primary interpolation for the extrapolation and performing primary interpolation on the lowest-rank curve;
a secondary interpolator for performing secondary interpolation on a primary interpolation result of the lowest-rank curve and on the growth curve; and
a Bezier curve computer for converting degree of curve, computing spline control points, and performing output result.

6. A method for designing curves, comprising the steps of:
inputting values including two Bezier curves, a lowest degree of the lowest-rank curve, a growing method of each curve, a control parameter of each curve growing method, an extrapolation constant $\beta$, a growth section, and a growth interval into a user input storage unit;
storing the values in the user input storage unit;
computing low-rank curves, which are (n−1)-degree Bezier curves, and vector field based on the input values with a low-rank curve computation unit;
storing the low-rank curves and vector fields in a low-rank curve storage unit;
computing a growth curve based on the low-rank curves; and
designing new curves by mixing the input values, the low-rank curves and the growth curve.

7. The method of claim 6, wherein the Bezier curves are converted into low-rank curves and vector field based on following equations 1 and 3:

$$b^n(t) = b^{n-1}(t) + 2t(1-t)f^{n-2}(t) \quad \text{Equation 1}$$

$$b^n(t) = b^1(t) + 2t(1-t)\sum_{i=0}^{n-2} f^i(t) \quad \text{Equation 3}$$

where 1 denotes a parameter;
n denotes a degree;

b''(t) denotes a Bezier curve; and f'(t) denotes a vector field.

8. The method of claim 7, wherein in the step of computing a growth curve, hierarchical linear growth, Bezier growth, and spline growth are computed based on the low-rank curves and the vector field.

9. The method of claim 8, wherein the computation of hierarchical linear growth is defined as following equation 4:

$$d_p(s,t) = b^1(t) + 2t(1-t)\sum_{i=0}^{n-2}\alpha_i(s)f^i(t) \qquad \text{Equation 4}$$

where $d_p(s,t)$ is a hierarchical linear growth curve; and
$a_i(s)$ is a weight that vector field f'(t) contributes to the growth path.

10. The method of claim 8, wherein the computation of Bezier growth is defined as following equation 6:

$$d_b(s,t) = \sum_{i=0}^{n-1} b^{i+1}(t)B_i^{n-1}(s) \qquad \text{Equation 6}$$

$$= b^1(t) + 2t(1-t)\sum_{i=0}^{n-1}\sum_{j=0}^{i-1} f^j(t)B_i^{n-1}(s)$$

where $d_b(s,t)$ is a Bezier growth curve; and
a Bezier curve b(t) is $$\sum_{i=0}^{n} B_i^n b_i.$$

11. The method of claim 8, wherein the computation of spline growth is defined as following equation 7:

$$d_s(s,t) = \sum_{i=0}^{n-1} p_i N_{i,3}(s) \qquad \text{Equation 7}$$

where $d_p(s,t)$ denotes a spline growth curve;
$p_i$ is $d_p(s,t)=b^i(t)$ with respect to an arbitrary $s_i$; and
$N_{i,3}(S)$ is a 3-degree basis function of B-spline.

12. The method of any one of claims 6 to 11, wherein the step of designing new curves includes the steps of:
performing primary interpolation on a lowest-rank curve of the two Bezier curves;
performing secondary interpolation onto a primary interpolation result and the computed growth curve;
adjusting size of the primary interpolation with respect to the secondary interpolation result based on the primary interpolation result and the inputted extrapolation constant; and
adjusting smoothness of curve with the lowest degree of the lowest-rank curve.

13. The method of claim 12, wherein curves are mixed in the secondary interpolation step based on following equation 12:

$$t^2(s,t)=d^a(s,t)B_0^2(s)+t^1(s,t)B_1^2(s)-+d^b(s,t)B_2^1(s) \qquad \text{Equation 12}$$

where $t^1(s,t)=(1-s)b_a^p(t)+sb_b^q(t)$;
$b_a^p(t)$ and $b_a^q(t)$ are the lowest-rank curves;
$d^a(s,t)$ is growth step of a given curve $b_a^m(t)$;
$d^b(s,t)$ is growth step of a given curve $b_a^{n2}(t)$; and
p and q are degrees of the lowest-rank curves, respectively.

14. The method of claim 12, wherein linear extrapolation is performed on the $t^1(s,t)$ and $t^2(s,t)$ in the step of adjusting size of the primary interpolation based on following equation 13:

$$t(s,t)=(1-e(s))t^1(s,t)+e(s)t^2(s,t) \qquad \text{Equation 13}$$

where e(s) denotes an extrapolation weight;

$$e(s) = \frac{1}{1-\beta s(1-s)}; \text{ and}$$

s denotes a control parameter of each growth method.

* * * * *